United States Patent [19]

Schievelbein

[11] 3,934,012

[45] Jan. 20, 1976

[54] METHOD OF SEPARATING HYDROGEN SULFIDE FROM CARBON DIOXIDE

[75] Inventor: Vernon Hugo Schievelbein, Houston, Tex.

[73] Assignee: Texaco Inc., New York, N.Y.

[22] Filed: Apr. 22, 1974

[21] Appl. No.: 462,906

Related U.S. Application Data

[63] Continuation-in-part of Ser. No. 263,910, June 19, 1972, abandoned.

[52] U.S. Cl. .............................................. 423/232
[51] Int. Cl.² .......................................... B01D 53/34
[58] Field of Search .......... 423/210, 220, 232, 233, 423/224

[56] References Cited

UNITED STATES PATENTS 1,918,153   7/1933   Wagner.............................. 423/232

*Primary Examiner*—Earl C. Thomas
*Attorney, Agent, or Firm*—T. H. Whaley; C. G. Ries; Kenneth R. Priem

[57] ABSTRACT

Hydrogen sulfide gas may be separated from a mixture of hydrogen sulfide and carbon dioxide by passing the gaseous mixture through an aqueous solution of bicarbonate ions.

26 Claims, No Drawings

METHOD OF SEPARATING HYDROGEN SULFIDE FROM CARBON DIOXIDE

This is a Continuation-in-Part of copending application Ser. No. 263,910, filed June 19, 1972, and now abandoned.

BACKGROUND OF THE INVENTION

Field of the Invention

This invention is concerned with the removal of hydrogen sulfide from a mixture of gases.

In many industrial processes and in the oil production industry, concern over pollution has compelled the more complete removal of harmful or offensive gases from effluent gas streams before release into the atmosphere. Also, many chemical processes demand streams of gases of specific composition.

The problem is to separate gases from each other efficiently and economically.

A gas which is of particular concern as a pollutant is hydrogen sulfide. Hydrogen sulfide and other sulfur compounds are both offensive and harmful. Hydrogen sulfide, for example, can cause corrosion problems and is also toxic in concentrated amounts. Even in considerably less than toxid concentrations, hydrogen sulfide has an offensive odor.

The removal of hdyrogen sulfide is complicated by the fact that it often occurs as a component in a mixture of gases. One frequently occurring mixture of gases is hydrogen sulfide and carbon dioxide. Carbon dioxide is usually tolerated and not considered as a pollutant. Thus, it may be released into the atmosphere. There are many processes which will remove both hydrogen sulfide and carbon dioxide from gas streams and a few which may be made to preferentially remove hydrogen sulfide. Some of these processes use in combination or alone, monoethanolamine and diethanolamine. Others use propylene carbonate, a combination of an alkali metal carbonate and an alkali metal arsenate, and others use a mixture of tetrahydrothiophene-1,1-dioxide and alkanolamines. It is also known in the art to use an aqueous basic solution to remove both carbon dioxide and hydrogen sulfide since both gases increase in solubility in aqueous solutions as the pH of the solution rises.

These prior art processes have disadvantages such as requiring addition of fresh reagents as the active ingredients are used up in the process or regeneration of these active ingredients. In many of these processes, carbon dioxide will neutralize or inactivate the active ingredients and result in inefficient hydrogen sulfide removal and/or compel frequent regeneration of reagents. Also, because of carbon dioxide absorption problem, constant surveillance and manipulation of the absorption system may be required. The present invention overcomes these problems by providing inexpensive, self-regulating aqueous solutions which effectively absorb hydrogen sulfide and allow most of the carbon dioxide to remain in the aqueous phase.

SUMMARY OF THE INVENTION

The invention is a method for preferentially removing hydrogen sulfide from a gas mixture comprising hydrogen sulfide and carbon dioxide by treating the gas mixture with an aqueous solution consisting of bicarbonate ions in sufficient concentration to establish an equilibrium imbalance to prevent substantial dissolution of carbon dioxide. The solution may also contain inert salts. The invention is also the aqueous solution for use in separating hydrogen sulfide from carbon dioxide.

DESCRIPTION OF THE PREFERRED EMBODIMENTS

The method of this invention will preferentially absorb hydrogen sulfide from various mixtures of gases which also contain carbon dioxide. These gas mixtures may contain other constituents such as hydrocarbons and inert gases such as nitrogen. Wagner's U.S. Pat. No. 1,918,153 indicates that the reaction.

$$NaHS + CO_2 + H_2O \rightleftarrows NaHCO_3 + H_2S$$

proceeds from left to right due to the fact that carbonic acid gas is a slightly stronger acid than hydrogen sulfide. I have found that contrary to the allegations or Wagner the above reaction will proceed from right to left under conditions which maintain a high level of concentration of bicarbonate ions in the aqueous medium at atmospheric pressure. Required bicarbonate ion concentrations are presented hereinafter. The process of this invention is of particular advantage where the concentration of carbon dioxide is relatively high with respect to the concentration of hydrogen sulfide. This is so because in conventional basic systems, the carbon dioxide is absorbed in proportion to its concentration and reduces the pH of the system to the point that hydrogen sulfide is no longer absorbed necessitating the addition of more basic material to the aqueous solution. The process of the present invention prevents major fluctuations in the pH of the aqueous solution by the presence of bicarbonate ions in the aqueous medium. While there is no intention to limit the success of the present invention to a specific mechanism, the following is believed to be explanatory of the operative chemical action of the present invention.

When carbon dioxide dissolves in water the following equilibrium reaction takes place:

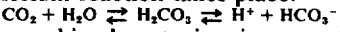
$$CO_2 + H_2O \rightleftarrows H_2CO_3 \rightleftarrows H^+ + HCO_3^-$$

If excess bicarbonate ion is present in the aqueous solution, the equilibrium solubility of carbonic acid ($H_2CO_3$) decreases and, consequently, the carbon dioxide is reduced in solubility and the pH of the solution remains constant.

The solubility in water of hydrogen sulfide is governed by the following equilibrium:

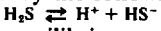
$$H_2S \rightleftarrows H^+ + HS^-$$

The equilibrium solubility of hydrogen sulfide decreases as the pH of the solution decreases. Since the presence of the bicarbonate ion, in effect, keeps the pH from varying greatly and prevents carbon dioxide from dissolving, the hydrogen sulfide is preferentially absorbed into the aqueous solution; that is, a greater percentage of hydrogen sulfide than carbon dioxide is dissolved.

This invention entails treating a gas containing hydrogen sulfide and carbon dioxide with a bicarbonate rich aqueous solution. The treating may be made in any conventional gas-liquid contactor. For example, the aqueous solution may be sprayed over the gases or a packed tower may be used. The gas may also be bubbled through a vessel containing the aqueous solution of bicarbonate ions. The particular manner of contacting the aqueous solution of bicarbonate ions and the hydrogen sulfide-carbon dioxide containing gas is not included as an element of this invention and, therefore, any conventional and efficient manner of contacting found convenient is suitable for the operation of this invention. It is within the capability of one skilled in the art to chose a method efficient enough to remove the required amount of hydrogen sulfide from a given stream of gas input.

The bicarbonate ions in the aqueous solution may be derived from any one or a mixture of water soluble salts of bicarbonate anions such as ammonium bicarbonate, sodium bicarbonate, potassium bicarbonate, magnesium bicarbonate, calcium bicarbonate and transition metal salts of the bicarbonate anions to name only a few. Sodium and potassium bicarbonate salts are preferred because they are very soluble in water and are extremely stable and do not tend to form mineral scale on the surface of the gas-liquid contactor and associated equipment.

If a bicarbonate salt as above is used, the bicarbonate ions are present immediately upon dissolution of the salt in the water and, therefore, the selectivity of the solution for hydrogen sulfide will be established from the beginning of carbon dioxide-hydrogen sulfide contact.

Alternatively, in another embodiment of this invention water soluble carbonate salts of various cations may be used in the process of this invention. In this embodiment the water soluble carbonate salts are dissolved in an aqueous medium and are contacted with a source of carbon dioxide to convert the carbonate ions to bicarbonate ions according to the following reaction:

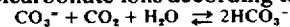
$CO_3^- + CO_2 + H_2O \rightleftarrows 2HCO_3^-$

The resulting solution of bicarbonate ions will then selectively absorb hydrogen sulfide.

The carbon dioxide to convert the carbonate ion to bicarbonate ion may be in pure form in which case a short preconditioning step comprising conversion of carbonate to bicarbonate ions will precede the process of separating hydrogen sulfide from a mixture of hydrogen sulfide and carbon dioxide. However, since the conversion of carbonate to bicarbonate ions is a very rapid, the gas mixture of hydrogen sulfide and carbon dioxide may be used as a source of carbon dioxide, thus eliminating the need for pretreatment with a pure carbon dioxide source.

In yet another embodiment of this invention, water soluble acid phosphate salts of ammonia, alkali metals and alkaline earth metals may be used. For example, ammonium orthophosphate (di- and tribasic), sodium phosphate (di- and tribasic), potassium phosphate (di- and tribasic), calcium phosphate (di- and tribasic), magnesium phosphate (di- and tribasic) and barium phosphate (di- and tribasic) are suitable.

When these phosphate salts are used, carbon dioxide is absorbed in the solution for a time forming bicarbonate ions. The process may proceed as follows for a typical salt:

$Na_2HPO_4 \rightleftarrows 2Na^+ + HPO_4$
$HPO_4^- + H_2O \rightleftarrows H_2PO_4^- + OH^-$
$OH^- + CO_2 \rightleftarrows HCO_3^-$ Thus, the bicarbonate ion is formed which will inhibit further carbon dioxide dissolution.

Other sources of bicarbonate ions may occur to those skilled in the art without departing from the scope of this invention.

Inert or neutral salts, that is salts which do not impart an acidic or basic character to an aqueous solution may also be present along with the bicarbonate salts in the aqueous solution of my invention. However, salts which do impart a basic or acidic character to an aqueous solution such as carbonate are not acceptable in the aqueous solution of my invention except in trace amounts which have minuscule effect on the solution.

The concentration of bicarbonate forming salt required must be large enough to establish an equilibrium imbalance which will prevent carbon dioxide from dissolving in the aqueous solution in substantial amounts. The higher the concentration of bicarbonate ions, the more readily hydrogen sulfide will be dissolved and maintained in solution. The maximum concentration of bicarbonate ions is dictated by practical considerations such as the maximum solubility of the particular bicarbonate salt, the most desirable concentration of hydrogen sulfide in the aqueous solution from the liquid-gas contactor, the desired liquid circulation rate through the liquid-gas contactor and desired scrubbing efficiency. Bicarbonate ion containing solutions having from 0.01 g-moles/l to 0.25 g-moles/l of solubilized sodium bicarbonate or equivalent amount of other bicarbonate salts are preferred.

The process of this invention may be operated at ambient conditions of temperature and pressure if desired. Severe conditions are not necessary for the successful operation of this invention.

The contact time between the hydrogen sulfide/carbon dioxide gas and the aqueous solution must be adequate for equilibrium to be obtained so that a maximum amount of hydrogen sulfide will be dissolved. In general, with adequate mixing more than twenty seconds are seldom needed to reach equilibrium and equilibrium is often reached in a second or less. The necessary contact time is largely dependent on many other variables such as bubble size and mixing efficiency. The greater this efficiency the shorter the contact time may be. These are engineering details to be included in the design of each unit.

EXPERIMENTAL

EXAMPLE 1

A contactor comprising a vertical glass tube filled with glass beads was used as follows:

An aqueous solution was passed through the top of the contactor and proceeded through the contactor and out the bottom. A gas comprising 95.5% carbon dioxide and 4.5% hydrogen sulfide was bubbled into the bottom of the contactor in a counter current manner to the flow of the aqueous solution.

Three runs were made. In the first the aqueous solution contained no bicarbonate but was aerated with oxygen. In the second and third runs the aqueous solution contained sodium bicarbonate and dissolved oxygen. The contact time between the sour gas and aqueous solution was about two seconds.

The results indicate that the addition of the bicarbonate ion increased the ability of the aqueous solution to dissolve hydrogen sulfide in preference to carbon dioxide.

| Run | $H_2S$ as % of gas before treatment | $H_2S$ as % of gas after treatment | Content of aqueous solution contacting 95.5% carbon dioxide, 4.5% hydrogen sulfide gas |
|---|---|---|---|
| 1 | 4.5 | 2.92 | oxygen |
| 2 | 4.5 | 2.05 | oxygen, sodium bicarbonate |
| 3 | 4.5 | 2.02 | oxygen, sodium bicarbonate |

EXAMPLE 2

This example illustrates the ability of an unaerated aqueous solution of bicarbonate ions to selectively remove hydrogen sulfide from a mixture of hydrogen sulfide and carbon dioxide.

An aqueous solution was passed through the top of the contactor and out the bottom. A two component gas consisting of 96.33% carbon dioxide and 3.67% hydrogen sulfide was bubbled into the bottom of the contactor in a counter current manner to the flow of the aqueous solution.

Two runs were made. In the first run the aqueous solution contained no bicarbonate. In the second run the aqueous solution contained sodium bicarbonate. The contact time of the gas and liquid was about 3 seconds in both runs.

The results indicate that the addition of bicarbonate ion increased the ability of the aqueous solution to dissolve hydrogen sulfide in preference to carbon dioxide.

| Composition of gas before treatment | | Composition of gas after treatment | | Content of aqueous solution contacting 3.67% $H_2S$ and 96.33% $CO_2$ |
|---|---|---|---|---|
| Run | %$H_2S$ | %$CO_2$ | %$H_2S$ | %$CO_2$ | |
| 1 | 3.67 | 96.33 | 1.8 | 98.2 | — |
| 2 | 3.67 | 96.33 | 0.76 | 99.24 | Sodium bicarbonate |

I claim:

1. A method for preferentially removing hydrogen sulfide from a gas mixture comprising hydrogen sulfide and carbon dioxide which comprises
treating the gas mixture at atmospheric pressure with an aqueous solution consisting of inert salts and bicarbonate ions in sufficient concentration to establish an equilibrium imbalance to prevent substantial dissolution of carbon dioxide.

2. A method as in claim 1 wherein the bicarbonate ions arise from the dissolution of a bicarbonate salt.

3. A method as in claim 2 wherein the bicarbonate salt has an alkali metal cation.

4. A method as in claim 2 wherein the bicarbonate salt is present in an amount from about 0.01 gram moles per liter to about 0.25 gram-moles per liter.

5. A method as in claim 1 wherein the bicarbonate arises from the reaction between a carbonate ion solution and carbon dioxide.

6. A method as in claim 5 wherein the cation in solution with the carbonate anion is an alkali metal cation.

7. A method as in claim 5 wherein the carbonate salt is present in an amount from about 0.01 gram-moles per liter to about 0.25 gram-moles per liter.

8. A method as in claim 1 wherein the bicarbonate ions arise from the reaction between an acid phosphate ion solution and carbon dioxide.

9. A method as in claim 8 wherein the cation in solution with the acid phosphate anion is an alkali metal cation.

10. A method as in claim 8 wherein the acid phosphate salt is present in an amount from about 0.01 gram-moles per liter to about 0.25 gram-moles per liter.

11. A method for preferentially removing hydrogen sulfide from a gas mixture consisting of hydrogen sulfide and carbon dioxide which comprises
treating the gas mixture at atmospheric pressure with an aqueous solution consisting of inert salts and bicarbonate ions in sufficient concentration to establish an equilibrium imbalance to prevent substantial dissolution of carbon dioxide.

12. A method as in claim 11 wherein the bicarbonate ions arise from the dissolution of a bicarbonate salt.

13. A method as in claim 12 wherein the bicarbonate salt is present in an amount from about 0.01 gram moles per liter to about 0.25 gram moles per liter.

14. A method for preferentially removing hydrogen sulfide from a gas mixture comprising hydrogen sulfide and carbon dioxide which comprises
treating the gas mixture at atmospheric pressure with an aqueous solution consisting of bicarbonate ions in sufficient concentration to establish an equilibrium imbalance to prevent substantial dissolution of carbon dioxide.

15. A method as in claim 14 wherein the bicarbonate ions arise from the dissolution of a bicarbonate salt.

16. A method as in claim 15 wherein the bicarbonate salt has an alkali metal cation.

17. A method as in claim 15 wherein the bicarbonate salt is present in an amount from about 0.01 gram/moles per liter to about 0.25 gram/moles per liter.

18. A method as in claim 14 wherein the bicarbonate arises from the reaction between a carbonate ion solution and carbon dioxide.

19. A method as in claim 18 wherein the cation in solution with the bicarbonate anion is an alkali metal cation.

20. A method as in claim 19 wherein the carbonate salt is present in an amount from about 0.01 gram/moles per liter to about 0.25 gram/moles per liter.

21. A method as in claim 14 wherein the bicarbonate ions arise from the reaction between an acid phosphate ion solution and carbon dioxide.

22. A method as in claim 21 wherein the cation in solution with the acid phosphate anion is an alkali metal cation.

23. A method as in claim 21 wherein the acid phosphate salts is present in an amount from about 0.01 gram/moles per liter to about 0.25 gram/moles per liter.

24. A method for preferentially removing hydrogen sulfide from a gas mixture consisting of hydrogen sulfide and carbon dioxide which comprises
treating the gas mixture at atmospheric pressure with an aqueous solution consisting of bicarbonate ions in sufficient concentration to establish an equilibrium imbalance to prevent substantial dissolution of carbon dioxide.

25. A method as in claim 24 wherein the bicarbonate ions arise from the dissolution of a bicarbonate salt.

26. A method as in claim 25 wherein the bicarbonate salt is present in an amount from about 0.01 gram/moles per liter to about 0.25 gram/moles per liter.

* * * * *